3,207,727
METHOD OF STABILIZING POLYOXYMETHYLENE
Kanji Matsubayashi, Takanobu Imada, and Kiyoshi Fujii, Kurashiki, Japan, assignors to Kurashiki Rayon Company Limited, Kurashiki, Japan, a corporation of Japan
No Drawing. Filed July 17, 1962, Ser. No. 210,586
Claims priority, application Japan, July 21, 1961, 36/25,747
12 Claims. (Cl. 260—67)

The present invention relates to a method of stabilizing polyoxymethylene characterized in that vinyl ethers are reacted with polyoxymethylene.

The principal object of the invention is to produce polyoxymethylene having high thermal stability by simple means and at lower cost.

The polyoxymethylene of high molecular weight which has heretofore been manufactured by the polymerization of formaldehyde or trioxane is liable to be depolymerized from the end as it has hydroxyl group usually at the end so that it is thermally unstable and it is well known to improve its thermal stability by reacting acid anhydride, orthoester or acetal to convert the end group to ester or ether group.

After the results of various investigations about the stabilization of polyoxymethylene the inventors have found out a new method and arrived at the invention, that is, it has been found by the invention that polyoxymethylene having excellent thermal stability can easily be obtained by reacting vinyl ethers with polyoxymethylene. According to the present method by reacting vinyl ethers with polyoxymethylene under a mild acidic condition polyoxymethylene having remarkably improved thermal stability can be obtained with high yield. It is considered that the improvement of such thermal stability is due to the reaction as shown by the following Formula 1, by which acetal or ketal of polyoxymethylene is produced.

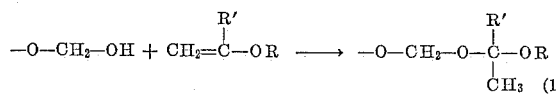

(1)

It is considered that when such a catalyst as mercury acetate is used vinyl ether of polyoxymethylene may be produced as in the Formula 2

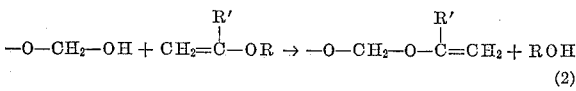

(2)

then it causes an additional reaction as shown by Formula 1 and acetal in the Formula 1 effects the interchange reaction of polyoxymethylene and acetal to combine two molecules of polyoxymethylene. At any rate, it is apparent that when vinyl ethers are reacted by the method of the present invention, the depolymerization due to the end group can be considerably suppressed so that it is apparent that the stable end group has been introduced.

It has heretofore been known, as the usual method of manufacturing polyoxymethylene ethers, a method wherein orthoester, orthocarbonate, acetal, ketal or alcohol and the like is reacted with polyoxymethylene in acid catalyst. On the other hand, the method of the present invention is not only entirely different from such known method and belongs to entirely new method of the production of polyoxymethylene ether or acetal, but also it is a very advantageous method if compared with the former methods. The reaction of the invention is an addition reaction as apparent from the Formula 1 which is a very quick reaction and does not accompany the byproducts of alcohol and water. On the other hand, in known methods there occurs byproduct of alcohol, water, etc. which causes splitting of the ether bond of the main chain of polyoxymethylene under the acidic condition so that it has disadvantages that result in the lowering of the degree of polymerization and the formation of unstable hydroxyl end group which causes troubles when the reacting solution is used repeatedly for industrial purposes. The invention actually provides a method for carrying out the stabilization reaction very smoothly without causing harmful effects to the polyoxymethylene.

The advantages of the invention will be explained by examples.

Polyoxymethylene having intrinsic viscosity $[\eta]$ 2.1 dl./g. at 60° C. in p-chlorophenol containing 2% of α-pinene and the thermal decomposition speed constant $K_{222}$ under nitrogen at 222° C., 1.5%/min. under nitrogen at 222° C. is reacted with vinyl ester under the several conditions. Its results are shown in Table 1 which shows that the thermal stability of polyoxymethylene has been remarkably improved with a small reduction of the polymerization degree so that the effect of the invention can be clearly recognized.

TABLE 1

| Vinyl ether (percent, based on polymer) | Catalyst (percent, based on polymer) | Solvent (percent, based on polymer) | Temp. (° C.) | Time (hr.) | Yield percent of polymer | $[\eta]$ dl./g. | $K_{222}$ (percent/min.) |
|---|---|---|---|---|---|---|---|
| | | | | | | 2.1 | 1.57 |
| Vinyl-n-butylether (200) | $BF_3 \cdot C_2H_5OC_2H_5$ (0.2) | Dioxane (800) | 125 | 3 | 95 | 2.0 | 0.00 |
| Do | HCl (1.0) | Dimethyl formamide (800) | 140 | 1 | 90 | 1.8 | 0.0 |
| Vinyl isobutylether (1,000) | Mercury acetate (1.0) | | Reflux | 2 | 100 | 2.1 | 0.15 |
| Vinyl methylether (100) | $BF_3 \cdot C_2H_5OC_2H_5$ (0.02) | | 160 | ½ | 97 | 2.0 | 0.00 |
| Divinylether (100) | $BF_3 \cdot C_2H_5OC_2H_5$ (0.02) | | 140 | 1 | 95 | 2.8 | 0.35 |
| Vinyl hexylether (1,000) | $BF_3 \cdot C_2H_5OC_2H_5$ (0.2) | | Reflux | 1 | 95 | 2.0 | 0.05 |

The inventors have found that if vinyl ethers containing nitrogen such as vinyl-β-dimethylaminoethyl ether is used the nitrogen is introduced to the end group and more remarkably improves the thermal stability of polyoxymethylene. Its exact reason is not yet sufficiently clear, yet it may be considered that the introduced acetal bond is protected against the action of acid by the nitrogen introduced at the same time. Irrespective of the reason the method of the invention enables it to produce polyoxymethylene of exceedingly high stability if compared with the known prior methods of adding amines, ureas or polyamides which have heretofore been used and it is considered that in the method of the invention the introduced nitrogen acts very effectively, and the filament spun from such solution exhibits very excellent dyeability to acid dyes, etc.

The reaction of the invention is usually carried out by treating polyoxymethylene in a liquid or vapour containing vinyl ethers and if necessary containing catalyst. The quantity of vinyl ethers to be used should be more than 0.1% to polyoxymethylene and vinyl ethers may be used by dissolving it in its solvent, for instance, dioxane, tetrahydrofuran, ether, dimethylformamide, phenol. By using a solvent having dissolving action or swelling effect to the polyoxymethylene the reaction may sometimes be accelerated. Acid catalysts such as boron fluoride, copper chloride, ferric chloride, aluminium chloride, zinc chloride, tin tetrachloride, hydrochloric acid, hydrogen bromide, sulphuric acid, phosphoric acid, p-toluene sulfonic acid; or mercuric salt catalysts such as mercuric acetate can be effectively used and also basic catalysts such as trimethyl amine, dimethyl cyclohexyl amine, benzyl amine and pyridine may also be used. The temperature at 50 to 200° C. and time of a few minutes to several ten hours are suitable.

As polyoxymethylene use is made of such one having molecular weight at least 10,000 and either one or both of its end groups is hydroxyl group or such a group as ester group or halogen which produces easily hydroxyl group.

Vinyl ethers expressed by the following general formula can be used.

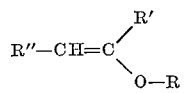

wherein

R is a radical selected from the group consisting of an alkyl having 1 to 18 carbon atoms, alkenyl having 2 to 4 carbon atoms and aryl radical having 6 to 10 carbon atoms;

R' is a radical selected from the group consisting of hydrogen, methyl, ethyl, phenyl and vinyl radicals; and, R" is a radical selected from the group consisting of hydrogen, halogen, methyl, ethyl, methoxy and ethoxy radicals.

The following may be used: Aliphatic or aromatic vinyl ethers, such as, vinyl methyl ether, vinyl ethyl ether, vinyl-n-butyl ether, vinyl-i-butyl ether, vinyl-tert.-butyl ether, vinyl amyl ether, vinyl hexyl ether, vinyl cyclohexyl ether, vinyl octyl ether, vinyl nonyl ether, vinyl dodecyl ether, vinyl cetyl ether, vinyl oleyl ether, divinyl ether, vinyl phenyl ether, vinyl-O-cresyl ether, vinyl-β-phenylethyl ether, vinyl-O-ethylphenyl ether, vinyl benzyl ether, vinyl-α-naphthyl ether; α- or β- substituted aliphatic or aromatic vinyl ethers, such as α-methylvinyl methyl ether, α-methylvinyl ethyl ether, α-ethylvinyl ethyl ether, α-phenylvinyl methyl ether, vinyl aryl ether, vinyl methacryl ether, β-methylvinyl methyl ether, α-, β-dimethylvinyl methyl ether, 2-methoxy-1,3-butadiene; and vinyl ethers containing functional group, such as halogen, basic nitrogen, hydroxyl group, alkoxyl group, carboxyl group, carbonyl group, ester group, acid amide group, urethane group, ureido group, cyano group, sulfo group and the like, such as vinyl carboxymethyl ether, vinyl carbomethoxymethyl ether, vinyl methoxymethyl ether, vinyl-β-methoxyethyl ether, vinyl-β-ethoxyethyl ether, vinylpolyoxyethylene ether, ethylene glycoldivinyl ether, vinyl-β-hydroxyethyl ether, β-ethoxyvinylethyl ether, 1,3-dimethoxy-2-butene, vinyl-β-chloroethyl ether, vinyl-p-chlorophenyl ether, vinyl-p-chlorobenzyl ether, vinyl-2,4-dichlorophenyl ether, vinyl-β-cyanoethyl ether, vinyl - β - aminoethyl ether, vinyl-β-diemthylaminoethyl ether, vinyl-β-diethylaminoethyl ether, diethanolamine monovinyl ether, diethanolamine divinyl ether, vinyl-β-anilinoethyl ether, vinyl-β-piperidinoethyl ether, vinyl-β-morpholinoethyl ether, vinyl-β-carbamoylethyl ether, β-vinyloxyethyl urea, β-vinyloxyethylurethane, vinyl-β-pyridylethyl ether, vinyl-β-sulfoethyl ether, β-chlorovinylmethyl ether, or vinyl ether or N,β-amino hydroxyethylpyrolidone.

The polyoxymethylene stabilized by the method of the invention can be formed to strong shaped articles, films and filaments.

The invention will be explained by examples in the following:

Example 1

A mixture consisting of 5 g. of polyoxymethylene having intrinsic viscostiy [η] 2.1 dl./g. in p-chlorophenol containing 2% of α-pinene at 60° C., 10 g. of vinyl-n-butylether, 40 g. of dioxane, 0.01 cc. boron fluoride ether complex was charged into an autoclave in which air was replaced with nitrogen and heated at 125° C. for 3 hours, and the polymer was washed with acetone and dried at 60° C. under reduced pressure. The polymer thus recovered was 4.75 g. having intrinsic viscosity [η] 2.0 dl./g. The product was hot-pressed at 180° C. to form a film which was very tough and strong. The thermal decomposition speed constant $K_{222}$ measured from the reduction of weight by heating in nitrogen at 222° C. was 0.05%/min. On the contrary, polyoxymethylene not subjected to the stabilization treatment showed 1.5%/min. of $K_{222}$. It will be apparent that the thermal stability of polyoxymethylene has been considerably improved by the method of the invention.

Example 2

Using dimethylformamide instead of dioxane and 0.05 g. of hydrogen chloride instead of 0.01 of boron fluoride ether complex in Example 1, the reaction was carried out at 140° C. for 1 hour, then polyoxymethylene having remarkably improved thermal stability as shown in Table 1 was obtained with a slight decrease in the degree of polymerization.

Example 3

Polyoxymethylene having [η] 1.5 dl./g. measured by the similar manner to that in Example 1 was made contact with vinyl methyl ether gas (containing 0.02% of boron fluoride ether complex) diluted with nitrogen gas at 160° C. for 30 minutes, then after purified with acetone it was dried at 60° C. The polymer yield was almost quantitative. The reduction in weight when heated to 190° C. for 1 hour was only 1.1% so that the thermal stability was considerably improved. On the other hand, when the present treatment was not carried out, that is, the original polyoxymethylene showed the reduction in weight of 51%.

Example 4

A similar operation to Example 3 was conducted by using polyoxymethylene in Example 1, except using divinyl ether instead of vinyl methyl ether. Its results are shown in Table 1 showing some increase in the degree of polymerization and considerable improvement in the thermal stability.

Example 5

A mixture of 10 g. of polyoxymethylene, 100 g. of vinyl cyclohexyl ether and 0.02 g. of boron fluoride ether complex in Example 1 was heated and refluxed for 1 hour, then polymer was filtered and washed with acetone and after washed with water, and further washed with acetone containing 0.1% of diphenyl amine and dried. The polymer thus obatined showed extremely good thermal stability as shown in Table 1.

Example 6

To 10 g. of polyoxymethylene in Example 1 were added 10 g. of vinyl-β-diethylaminoethyl ether and 90 g. of tetrahydrofuran and also 0.01 cc. of boron fluoride ether complex, and the mixture was heated at 140° C. for 30 minutes and polymer was washed out with acetone and further washed with 1% aqueous ammonia and again washed with acetone. The product thus obtained showed extremely excellent thermal stability which was 0.01%/min. as $K_{222}$.

Example 7

If, instead of vinyl-β-diethyl aminoethyl ether in Example 6, vinyl-β-dimethyl aminoethyl ether was used, polyoxymethylene was obtained having substantially same properties as those obtained in Example 6. The product was hot-pressed for 1 minute at 180° C. and the film thus obtained was dyed in an aqueous solution containing acid dyestuff, acid brilliant scarlet 3R (C.I. Acid Red 18) and 2% (to film) of sulphuric acid at 80° C. for 2 hours, then dyed to dense shade.

*Example 8*

A mixture consisting of 10 g. of polyoxymethylene having intrinsic viscosity, [η] 1.65 dl./g. in p-chlorophenol containing 2% of α-pinene at 60° C., 50 g. benzyl vinyl ether and 0.005 g. of hydrogen chloride was charged in three-mouthed flask and the air was replaced with nitrogen and heated at 160° C. for 1 hour while stirring. Benzyl vinyl ether is a good solvent for polyoxymethylene so that the reaction proceeded in homogeneous solution system at atmospheric pressure. After the reaction, the powder of polymer precipitated by cooling was washed with methanol and dried at 60° C. under a reduced pressure. The polymer thus recovered was 10 g. having intrinsic viscosity [η] 1.6 dl./g. The polymer was hot-pressed at 180° C. to a film which was very strong. The thermal decomposition speed constant $K_{222}$ measured by the reduction in weight when heated in nitrogen at 222° C. was 0.02%/min. so that it showed very good thermal stability. On the other hand, the value of $K_{222}$ of polyoxymethylene which was not subjected to the stabilization treatment was 1.6%/min. so that it is apparent that the thermal stability is remarkably improved by the method of the invention.

*Example 9*

The reaction was carried out by using polyoxymethylene having the intrinsic viscosity [η] 1.20 dl./g. and benzyl vinyl ether diluted with dimethylformamide. A mixture of 10 g. of polyoxymethylene, 10 g. of benzyl vinyl ether, 40 g. of dimethylformamide and 0.005 g. of hydrogen chloride was reacted at 160° C. for two hours and yielded 9.9 g. of polymer having $K_{222}$ of 0.02%/min. The intrinsic viscosity of the polymer thus obtained was 1.17 dl./g. and the reduction in the degree of polymerization was very few and its $K_{222}$ value was exceedingly better than that of 1.8%/min. of the original polyoxymethylene.

*Example 10*

Instead of hydrogen chloride in Example 9, use was made of hydrogen bromide and the reaction was carried out at 160° C. for 30 minutes. The polymer yield was quantitative and $K_{222}$ was 0.05%/min. and [η] was 1.15 dl./g.

*Example 11*

Instead of dimethyl formamide in Example 8, use was made of cyclohexanone and the reaction was carried out at 160° C. for 1 hour at atmospheric pressure. The product thus obtained was washed with methanol and then dried at 60° C. under reduced pressure. The recovered polymer was quantitative. The thermal decomposition speed constant $K_{222}$ measured in nitrogen at 222° C. was 0.05%/min. and it showed remarkable improvement in the thermal stability. 5 g. of thus stabilized polymer were charged into a triangular flask and 50 g. of benzyl alcohol containing 0.05% metal sodium were added and the mixture was dissolved by heating at 160° C. for 30 minutes by stirring and the product after cooling was washed with methanol and dried at 60° C. under reduced pressure. The yield of polymer thus obtained was 4.8 g. The polymer was hot-pressed and shaped to a film which showed the thermal decomposition speed constant $K_{222}$ in nitrogen was 0.01%/min. and it showed that the thermal stability was further improved by the alkaline treatment. The reduction in intrinsic viscosity [η] was not recognized absoultely by this treatment. On the other hand, if the similar treatment was carried out by adding 20 g. of benzyl alcohol solution of the above metal sodium to 2 g. of unstabilized polyoxymethylene, then polyoxymethylene was perfectly decomposed and no polymer was yielded. This treatment was extremely effective for the purification of polyoxymethylene after the stabilization reaction and the stabilized products had alkaline resistance and was remarkably stable both thermally and chemically.

*Example 12*

Instead of benzyl vinyl ether in Example 8, use was made of phenyl vinyl ether for carrying out the homogeneous reaction at 160° C. for 1 hour, then the product was washed with methanol and dried at 160° C. under reduced pressure, then polymer was recovered quantitatively. The thermal decomposition speed constant $K_{222}$ measured at 222° C. in nitrogen of the film formed by hot-pressing at 180° C. of the above product was 0.02%/min. and [η] was 1.67 dl./g. ($K_{222}$ of the original polyoxymethylene is 1.6%/min.). Aromatic vinyl ether is good solvent for polyoxymethylene and constitutes homogeneous solution so that the stabilization reaction proceeds very smoothly and the stabilization effect due to the reaction is particularly remarkable.

What we claim is:

1. A method of stabilizing polyoxymethylene which comprises reacting polyoxymethylene with vinyl ethers represented by the following general formula

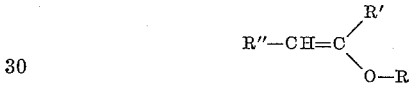

wherein
R is a radical selected from the group consisting of an alkyl having 1 to 18 carbon atoms, alkenyl having 2 to 4 carbon atoms and aryl radical having 6 to 10 carbon atoms;
R' is a radical selected from the group consisting of hydrogen, methyl, ethyl, phenyl and vinyl radicals; and,
R" is a radical selected from the group consisting of hydrogen, halogen, methyl, ethyl, methoxy and ethoxy radicals.

2. A method according to claim 1, wherein the vinyl ether is initially present in an amount of at least 0.1 weight percent based on the amount of polyoxymethylene.

3. A method according to claim 1, wherein the reaction is carried out at a temperature between about 50 to about 200° C. for at least several minutes.

4. A method according to claim 1, wherein the polyoxymethylene is a homopolymer having a molecular weight of at least 10,000.

5. A method according to claim 1, wherein the reaction is carried out in the presence of a solvent for the vinyl ether.

6. A method according to claim 1, wherein the vinyl-ether is a nitrogen containing vinyl-ether selected from the group consisting of vinyl-β-cyanoethyl ether, vinyl-β-aminoethyl ether, vinyl-β-dimethylaminoethyl ether, vinyl-β-diethylaminoethyl ether, diethanolamine monovinylether, diethanolamine divinyl ether, vinyl-β-anilinoethyl ether, vinyl-β-piperidinoethyl ether, vinyl-β-morpholino ethyl ether, vinyl-β-carbamoyl ethyl ether, β-vinyloxy ethylurea, β-vinyloxyethylurethane, vinyl-β-pyridylethyl ether, and vinyl ether of N,β-amino hydroxyethyl pyrrolidone.

7. A method of stabilizing polyoxymethylene which comprises reacting polyoxymethylene having a molecular weight of at least about 10,000 with at least one vinyl ether selected from the group consisting of vinyl methyl ether, vinyl ethyl ether, vinyl-n-butyl ether, vinyl-i-butyl ether, vinyl-tert.-butyl ether, vinyl amyl ether, vinyl hexyl ether, vinyl cyclohexyl ether, vinyl octyl ether, vinyl nonyl ether, vinyl dodecyl ether, vinyl cetyl ether, vinyl oleyl ether, divinyl ether, vinyl phenyl ether, vinyl-O-cresyl ether, vinyl-β-phenylethyl ether, vinyl-O-ethyl-phenyl ether, vinyl benzyl ether, vinyl-α-naphthyl ether, α-methylvinyl methyl ether, α-methylvinyl ethyl ether, α-ethylvinyl ethyl ether, α-phenylvinyl methyl ether, vinyl aryl ether, vinyl methacryl ether, β-methylvinyl methyl ether, α,β-dimethylvinyl methyl ether, 2-methoxy-1,3-butadiene, vinyl carboxymethyl ether, vinyl carbomethoxymethyl ether, vinyl methoxymethyl ether, vinyl-β-methoxyethyl ether, vinyl-β-ethoxyethyl ether, vinylpolyoxyethylene ether, ethylene glycoldivinyl ether, vinyl-β-hydroxyethyl ether, β-ethoxyvinylethyl ether, 1,3-dimethoxy-2-butene, vinyl-β-chloroethyl ether, vinyl-p-chlorophenyl ether, vinyl-p-chlorobenzylether, vinyl-2,4-dichlorophenyl ether, vinyl-β-cyanoethyl ether, vinyl-β-aminoethyl ether, vinyl-β-dimethylaminoethyl ether, vinyl-β-diethylamino ethyl ether, diethanolamine monovinyl ether, diethanolamine divinyl ether, vinyl-β-anilinoethyl ether, vinyl-β-piperidinoethyl ether, vinyl-β-morpholinoethyl ether, vinyl-β-carbamoylethyl ether, β-vinyloxyethyl urea, β-vinyloxyethylurethane, vinyl-β-pyridylethyl ether, vinyl-β-sulfoethyl ether, β-chlorovinylmethyl ether, and vinyl ether of N,β-amino hydroxyethylpyrrolidone, at a temperature between about 50° to 200° C. for at least several minutes.

8. A method according to claim 7, wherein the vinyl ether is vinyl-n-butyl ether.

9. A method according to claim 7, wherein the vinyl ether is vinyl methyl ether.

10. A method according to claim 7, wherein the vinyl ether is divinyl ether.

11. A method according to claim 7, wherein the vinyl ether is vinyl cyclo hexyl ether.

12. A method according to claim 7, wherein the vinyl ether is vinyl-β-diethylaminoethyl ether.

References Cited by the Examiner

UNITED STATES PATENTS

| | | | |
|---|---|---|---|
| 2,296,249 | 9/42 | Austin et al. | 260—67 |
| 2,844,561 | 7/58 | Bechtold et al. | 260—67 |
| 2,893,972 | 7/59 | Kubico et al. | 260—67 |
| 2,936,298 | 5/60 | Hudgin et al. | 260—67 |
| 3,002,952 | 10/61 | O'Connor | 260—67 |
| 3,087,913 | 4/63 | Kray et al. | 260—73 |

FOREIGN PATENTS

| | | |
|---|---|---|
| 848,660 | 9/60 | Great Britain. |
| 1,272,971 | 8/61 | France. |

OTHER REFERENCES

Kern et al., Angewandte Chemie, 73, No. 6, pp. 177–186, March 1961, QD 125, pp. 183–186 relied on.

WILLIAM H. SHORT, *Primary Examiner.*

JOSEPH L. SCHOFER, *Examiner.*